United States Patent
Noble, Jr.

(10) Patent No.: US 8,254,555 B1
(45) Date of Patent: *Aug. 28, 2012

(54) SYSTEMS AND METHODS FOR MANAGING INBOUND CALLS AND OUTBOUND CALLS FOR A SPECIFIC AGENT

(75) Inventor: James K. Noble, Jr., Marietta, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/460,016

(22) Filed: Apr. 30, 2012

Related U.S. Application Data

(63) Continuation of application No. 11/290,977, filed on Nov. 30, 2005.

(51) Int. Cl.
*H04M 3/00* (2006.01)

(52) U.S. Cl. ......... 379/265.01; 379/265.02; 379/265.05; 379/265.06; 379/265.09; 379/265.1; 379/266.01; 379/266.03; 379/266.06; 379/266.07; 379/266.08

(58) Field of Classification Search ............ 379/265.01–266.098
See application file for complete search history.

(56) References Cited

U.S. PATENT DOCUMENTS

| | | | |
|---|---|---|---|
| 5,181,236 A | 1/1993 | La Vallee et al. | |
| 5,206,903 A | 4/1993 | Kohler et al. | |
| 5,309,505 A | 5/1994 | Szlam et al. | |
| 5,425,093 A | 6/1995 | Trefzger | |
| 5,436,965 A | 7/1995 | Grossman et al. | |
| 5,537,470 A | 7/1996 | Lee | |
| 5,544,220 A | 8/1996 | Trefzger | |
| 5,553,133 A | 9/1996 | Perkins | |
| 5,594,791 A * | 1/1997 | Szlam et al. | 379/265.09 |
| 5,633,922 A | 5/1997 | August et al. | |
| 5,640,445 A | 6/1997 | David | |
| 5,703,943 A | 12/1997 | Otto | |
| 5,784,452 A * | 7/1998 | Carney | 379/265.06 |
| 5,809,128 A | 9/1998 | McMullin | |
| 5,815,566 A * | 9/1998 | Ramot et al. | 379/210.01 |
| 5,825,869 A | 10/1998 | Brooks et al. | |
| 5,828,731 A | 10/1998 | Szlam et al. | |
| 5,870,464 A | 2/1999 | Brewster et al. | |
| RE36,416 E | 11/1999 | Szlam et al. | |
| 6,170,011 B1 | 1/2001 | Macleod Beck et al. | |
| 6,208,970 B1 | 3/2001 | Ramanan | |
| 6,226,360 B1 | 5/2001 | Goldberg et al. | |
| 6,263,066 B1 | 7/2001 | Shtivelman et al. | |
| 6,570,975 B2 | 5/2003 | Shaffer et al. | |
| 6,633,639 B1 | 10/2003 | Ludford | |
| 6,636,598 B1 | 10/2003 | Thomson et al. | |
| 6,654,457 B1 | 11/2003 | Beddus et al. | |
| 6,700,965 B1 * | 3/2004 | Ferrer et al. | 379/201.02 |
| 6,707,906 B1 | 3/2004 | Ben-Chanoch | |

(Continued)

FOREIGN PATENT DOCUMENTS

WO    WO03028356    4/2003

*Primary Examiner* — Joseph J Nguyen

(57) ABSTRACT

Systems and methods for managing calls, both inbound and outbound, for available agents over a plurality of lines, where each call received or placed is pre-identified to be connected to one specific agent and upon the automatic detection of the call being received or answered, the call is either connected to the specific agent or placed in a queue for that specific agent.

18 Claims, 4 Drawing Sheets

U.S. PATENT DOCUMENTS

| | | |
|---|---|---|
| 6,714,643 B1 * | 3/2004 | Gargeya et al. .......... 379/266.06 |
| 6,744,881 B1 | 6/2004 | Price |
| 6,748,074 B2 | 6/2004 | Khan |
| 6,804,346 B1 | 10/2004 | Mewhinney |
| 6,813,349 B2 | 11/2004 | Johnson et al. |
| 6,826,194 B1 | 11/2004 | Vered et al. |
| 6,826,529 B1 | 11/2004 | Zhang et al. |
| 6,832,203 B1 | 12/2004 | Villena et al. |
| 6,850,615 B1 | 2/2005 | Patel et al. |
| 6,868,395 B1 | 3/2005 | Szlam et al. |
| 6,870,924 B1 | 3/2005 | Ukon |
| 7,046,789 B1 * | 5/2006 | Anderson et al. ........ 379/265.01 |
| 7,426,268 B2 | 9/2008 | Walker et al. |
| 7,564,962 B1 * | 7/2009 | O'Keeffe et al. ........ 379/265.09 |
| 2002/0047859 A1 | 4/2002 | Szlam et al. |
| 2002/0101977 A1 | 8/2002 | Takeuchi et al. |
| 2002/0145624 A1 | 10/2002 | Szlam et al. |
| 2002/0181398 A1 | 12/2002 | Szlam |
| 2003/0169870 A1 | 9/2003 | Stanford |
| 2004/0042611 A1 * | 3/2004 | Power et al. ............. 379/265.02 |
| 2004/0059841 A1 * | 3/2004 | Bateman et al. .................. 710/6 |
| 2004/0111310 A1 | 6/2004 | Szlam et al. |
| 2004/0120502 A1 * | 6/2004 | Strathmeyer et al. .... 379/265.01 |
| 2004/0133434 A1 | 7/2004 | Szlam et al. |
| 2004/0174979 A1 | 9/2004 | Hutton et al. |
| 2004/0179672 A1 | 9/2004 | Pagel et al. |
| 2004/0234066 A1 * | 11/2004 | Beckstrom et al. ...... 379/266.07 |
| 2004/0252823 A1 | 12/2004 | Becerra et al. |
| 2005/0002515 A1 | 1/2005 | Mewhinney et al. |
| 2005/0063529 A1 | 3/2005 | Meldrum et al. |
| 2005/0147228 A1 * | 7/2005 | Perrella et al. ........... 379/265.06 |

* cited by examiner

SYSTEMS AND METHODS FOR MANAGING INBOUND CALLS AND OUTBOUND CALLS FOR A SPECIFIC AGENT

CROSS-REFERENCE TO RELATED APPLICATIONS

The present application is a continuation of U.S. patent application Ser. No. 11/290,977 filed Nov. 30, 2005, and entitled "Systems and Methods for Managing Call Processing for a Specific Agent," the contents of which are incorporated by reference in their entirety into the present application.

FIELD OF THE INVENTION

The invention is related to the field of telephony and communications. More particularly, the invention relates to automated call distribution technology.

BACKGROUND OF THE INVENTION

Automated call distribution devices or call centers provide a way to handle large loads of incoming telephone calls for a particular business by routing the calls to the appropriate recorded information or service agent which can handle that particular call. In this business of customer contact technologies, several pieces of technology are widely used to provide customer contact. One such technology is a predictive dialer. This technology automatically places outbound calls, and connects only the human answered call results to agents to handle the calls. Since some of the calls result in non-human answered calls, no connection calls, not in service calls, or other non-responsive events that may be processed by the system without the need for an agent, the systems will place more calls than there are available agents based upon various mathematical formulas to predict the right number of calls to place to keep the agents busy talking while minimizing abandoned calls that can occur when more human answered calls occur than there are available agents. These systems generally place calls that can be connected to any one of a group of agents.

While this method of placing calls that can be handled by any one of a plurality of agents can maximize productivity and minimize abandoned calls, it presents a problem for businesses that desire to have specific calls that are placed connected only to specific agents. This may be desirable in several circumstances, for example, where there is the need to maintain continuity of the personal relationship between the person being called and the specific agent. Other circumstances are in the context of collections calls and customer service. Additionally, many outbound calls placed do not result in successful contact with the desired individual and messages must be left on answering machines or voicemail, or with another person to ask for the person to call back. When these inbound calls are returned at a later time, the desire may be once again to have the caller connected to the specific agent. So there is the need to improve existing customer contact technologies to allow for specific calls, whether they are outbound placed calls, or inbound calls, to be connected to specific agents while maintaining a high level of agent productivity at the same time.

BRIEF SUMMARY OF THE INVENTION

The present invention is directed to systems and methods for managing outbound calls, as well as inbound calls, associated with a specific agent. According to an embodiment of the invention, there are disclosed systems and methods for managing outbound calls associated with a specific agent. The methods include determining several sets of outbound calls, where each set of outbound calls is associated with a specific agent of a group of agents and placing those outbound calls. The systems and methods further include detecting a connection of one of the placed calls and routing the connected outbound call to the specific agent associated with that outbound call.

In an embodiment of the present invention for managing outbound calls, the number of outbound calls to be placed in each set of outbound calls for each agent and when each of those calls should be placed is determined using a mathematical formula. In another embodiment of the present invention, once an agent has been connected to a call, the other calls are either terminated, routed to a different agent, played a message asking them to return the call, played a message to hold for the specific agent and/or played a message asking to leave a voicemail. In yet another embodiment of the present invention, when a call is placed on hold the specific agent associated with that call is notified that the caller is waiting.

According to an embodiment of the invention, there are disclosed systems and methods for simultaneously managing outbound calls and inbound calls routed to a specific agent. The systems and methods include automatically placing outbound calls for available agents where each placed call is pre-associated with a specific agent of a group of agents. The systems and methods further include detecting that the placed call has been answered. While the outbound calls are being placed, the specific agent associated with the placed outbound calls is also identified as the specific agent for whom at least one inbound call is associated. Next, either the answered outbound call or the received inbound call is routed to the specific agent associated with that call. When the specific agent becomes available to accept a call, the next inbound or outbound call associated with that specific agent is routed to the specific agent.

In an embodiment of the present invention, the step of identifying which specific agent each inbound call must be connected to is determined by a phone number associated with the calling party, by receiving digits selected by the caller, and/or by the caller saying a specific identifier associated with the specific agent. In another embodiment of the present invention, the specific identifier is the agent's name, agent's title, agent's associated service number or the like.

In an embodiment of the present invention for simultaneously managing outbound calls and inbound calls routed to a specific agent, the number of outbound calls to be placed in each set of outbound calls and when each of those calls should be placed for each agent is determined using a mathematical formula. In other alternative embodiments of the present invention, once an agent has been connected to a call, the other calls are either terminated, routed to a different agent, played a message asking them to return the call, played a message to hold for the specific agent and/or played a message asking to leave a voicemail. In yet another embodiment of the present invention, when a call is placed on hold the specific agent associated with that call is notified that the caller is waiting.

In another embodiment of the present invention, if an inbound call is received and routed to the specific agent, all pending unanswered outbound calls associated with that specific agent are terminated. In yet another embodiment of the present invention, if an inbound call is received and the specific agent is unavailable, the caller is offered the option to hold for the specific agent to become available or to leave a voicemail message. In yet another embodiment of the present invention, if an inbound caller does not hold, once the specific agent becomes available an outbound call associated with the specific agent is placed to return the inbound call that did not hold. In another embodiment of the present invention, the caller may choose to leave a voicemail that is played for the specific agent once the specific agent becomes available. In yet another embodiment of the present invention, after the specific agent has played the voicemail, the specific agent returns the call as an outbound call associated with the specific agent.

According to an embodiment of the invention, there is disclosed a system for simultaneously managing outbound calls and inbound calls routed to a specific agent. The system includes an automatic call distributor connected to a network, where the automatic call distributor detects inbound calls associated with a specific agent of a group of agents connected to the automatic call distributor. The system further includes a predictive dialer connected to the network and automatic call distributor, where the predictive dialer places outbound calls associated with a specific agent on the network. The specific agent is allocated to handle a connected outbound call routed from the predictive dialer to the specific agent in the group of agents connected to the automatic call distributor.

In an embodiment of the present invention, the system further includes a CTI server in direct communication with the predictive dialer and an automatic call distributor, where the CTI server allocates the specific agent in the group of agents to handle the connected outbound call associated with the specific agent routed from the predictive dialer through the automatic call distributor to the specific agent in the group of agents. In yet another alternative embodiment of the present invention, the CTI server also allocates the specific agent in the group of agents to handle the connected inbound call associated with the specific agent routed from the automatic call distributor to the specific agent in the group of agents.

BRIEF DESCRIPTION OF THE DRAWINGS

Figure 1:
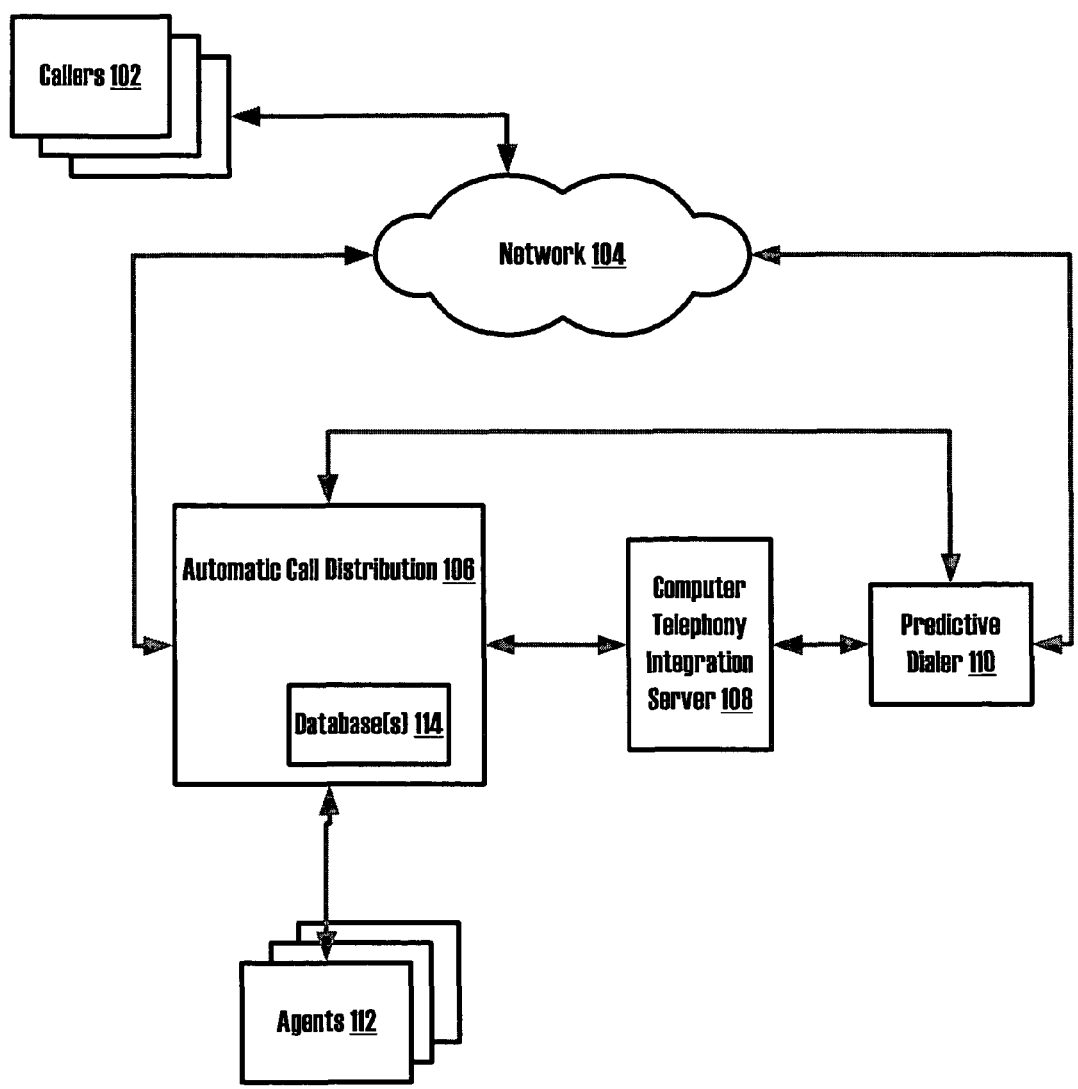

Having thus described the invention in general terms, reference will now be made to the accompanying drawings, which are not necessarily drawn to scale, and wherein:

FIG. 1 is a functional block diagram showing callers in communication with agents through a network and call center, in accordance with an exemplary embodiment of the present invention.

Figure 2:
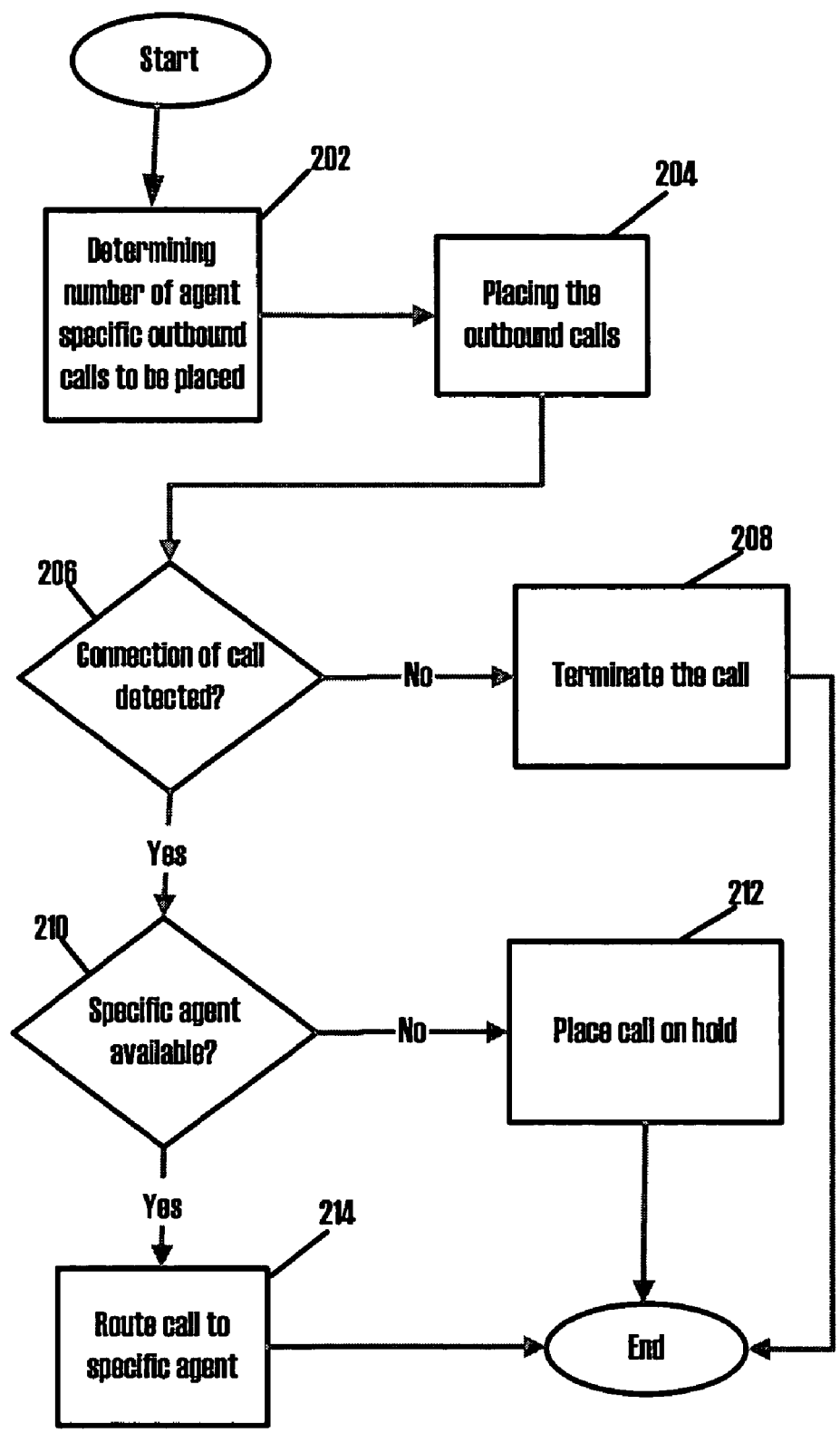

FIG. 2 is a flowchart of a process for placing outbound calls associated with specific agents, in accordance with an exemplary embodiment of the present invention.

Figure 3:
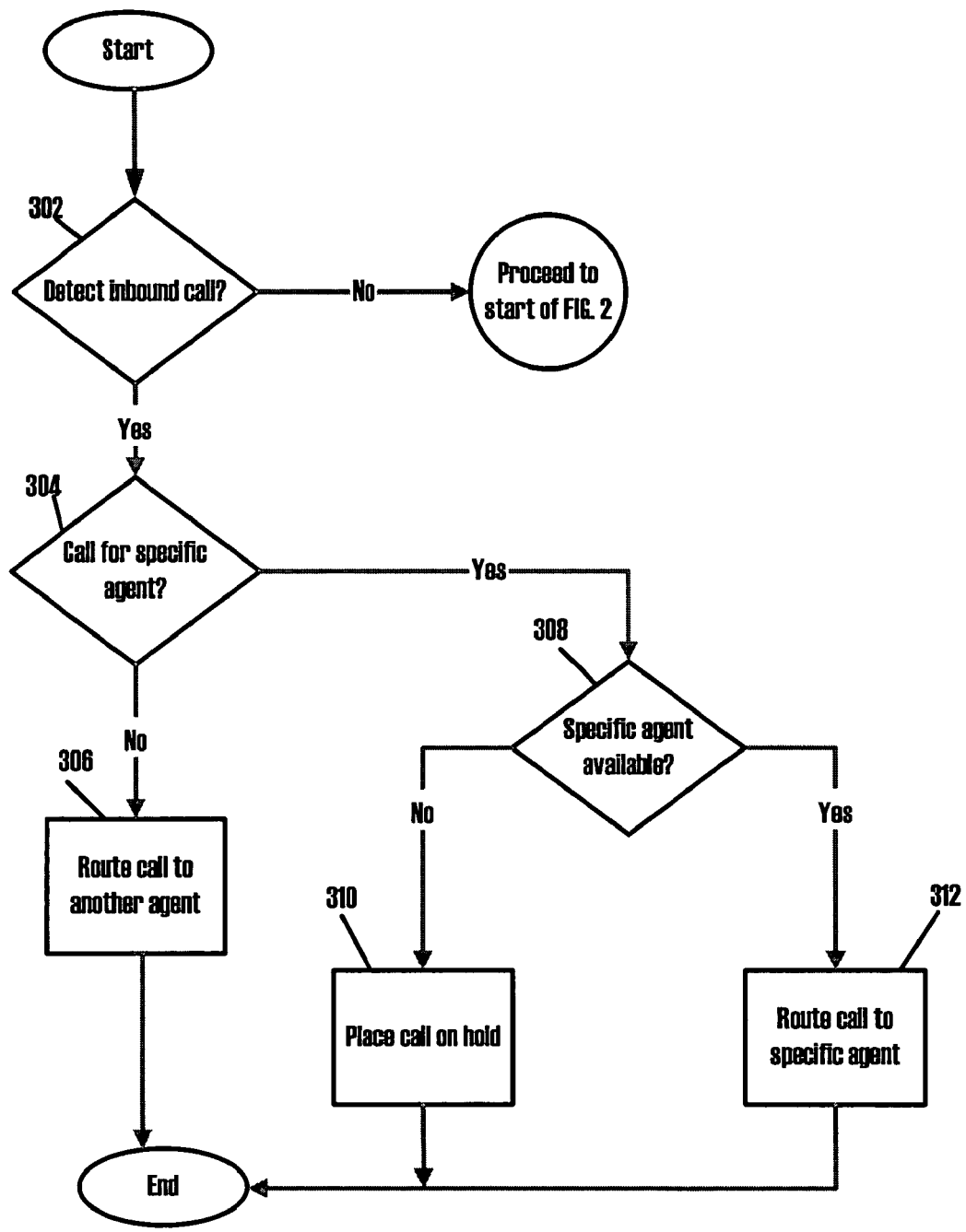

FIG. 3 is a flowchart of a process of routing inbound calls associated with specific agents to those specific agents, in accordance with an exemplary embodiment of the present invention.

Figure 4:
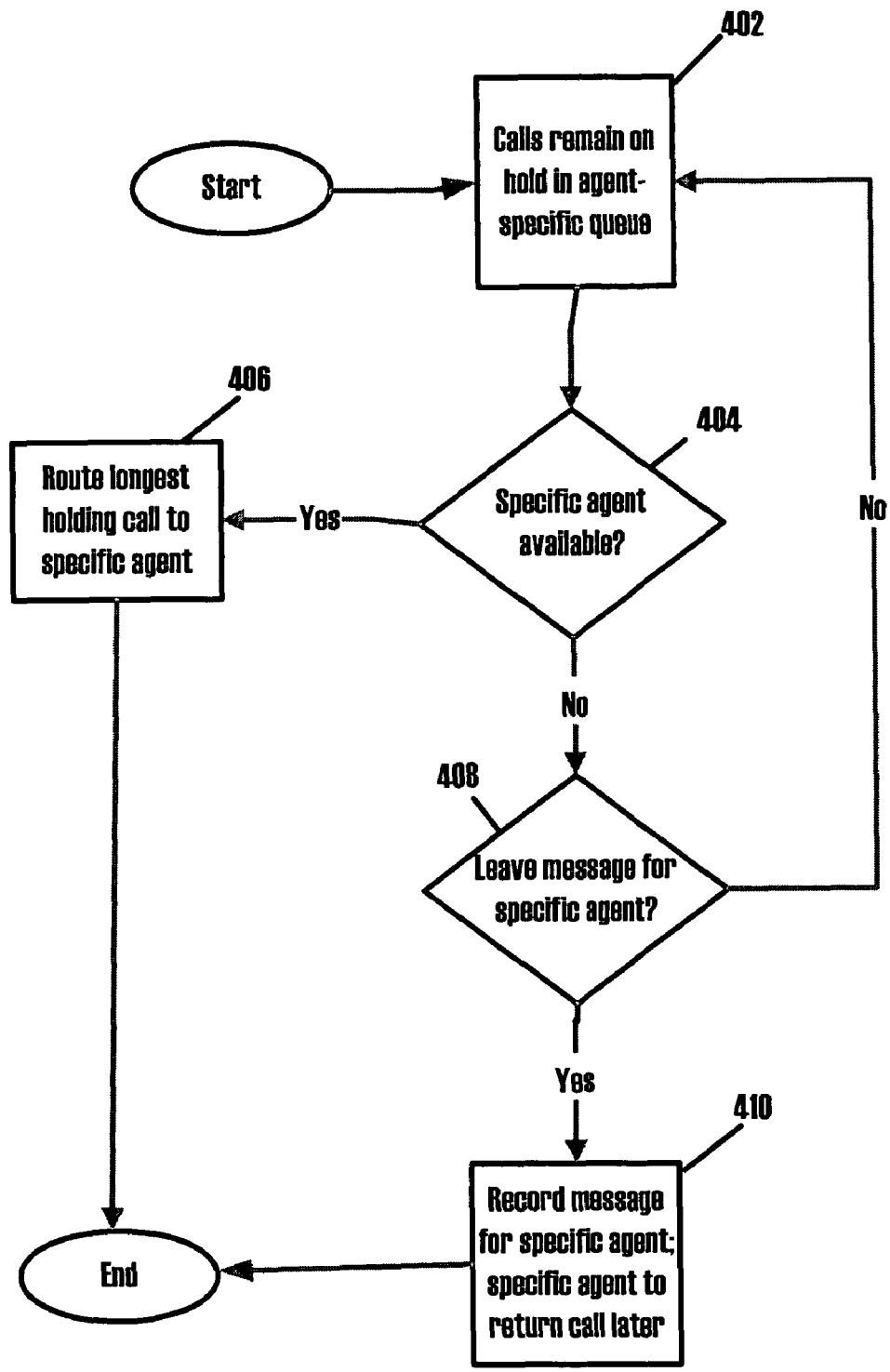

FIG. 4 is a flowchart of a process for processing calls, each of which is on hold for the specific agent associated with the call, in accordance with an exemplary embodiment of the present invention.

DETAILED DESCRIPTION OF THE INVENTION

The present invention comprises methods and systems that automatically route inbound and outbound calls associated with a specific agent. More specifically, the present invention is directed to systems and methods for managing calls, both inbound and outbound, for available agents over a plurality of lines, where each call received or placed is pre-identified to be connected to one specific agent and upon the automatic detection of the call being received or answered, the call is either connected to the specific agent or placed in a queue for that specific agent. The system can comprise a standalone system handling both inbound and outbound phone calls or it can comprise a separate system (e.g., an add-on) used in communication with a company's existing server already handling inbound calls.

The present invention is described below with reference to figures and flowchart illustrations of systems, methods, apparatuses and computer program products according to an embodiment of the invention. It will be understood that each block of the flowchart illustrations, and combinations of blocks in the flowchart illustrations, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions. The inventions may be implemented through an application program running on an operating system of a computer. The inventions also may be practiced with other computer system configurations, including hand-held devices, multiprocessor systems, microprocessor based or programmable consumer electronics, mini-computers, mainframe computers, etc.

Application programs that are components of the invention may include routines, programs, components, data structures, etc. that implement certain abstract data types, perform certain tasks, actions, or tasks. In a distributed computing environment, the application program (in whole or in part) may be located in local memory, or in other storage. In addition, or in the alternative, the application program (in whole or in part) may be located in remote memory or in storage to allow for the practice of the inventions where tasks are performed by remote processing devices linked through a communications network.

The present invention will now be described more fully hereinafter with reference to the accompanying figures, in which like numerals indicate like elements throughout the several drawings. Some, but not all embodiments of the invention are described. Indeed, these inventions may be embodied in many different forms and should not be construed as limited to the embodiments set forth herein; rather, these embodiments are provided so that this disclosure will satisfy applicable legal requirements, be thorough and complete, and will fully convey the scope of the invention to those skilled in the art.

FIG. 1 shows an exemplary schematic block diagram of a system in accordance with an embodiment of the present invention that is configured as an add-on to an existing call center. In this embodiment, a caller 102 places a call over an analog or digital telephone network 104 (e.g., the PSTN) or by utilizing voice over IP (VOIP), and the call is answered by the ACD 106, which normally will route the call (referred to as an "inbound call") to receiving agents 112 to service the inbound call. The ACD can be one of the numerous suitable ACDs offered commercially by manufacturers such as Aspect, Avaya, Nortel Networks, Siemens, Alcatel as well as others. The computer telephony integration (CTI) server 108 may allocate inbound calls to be handled by a particular agent. One way the CTI server 108 may implement such an allocation is by instructing the ACD 106 to route the inbound call to a specific agent in the group of receiving agents 112 based on identifying information received in connection with the inbound call. The received identifying information associating a specific agent with an inbound call may be but is not limited to the telephone number (ANI) associated with the inbound call, or alternatively, an automated screening process may be used to prompt a caller to press digits, or simply speak, in response to prompts for identifying information for a specific agent to which the caller wishes to speak. The identifying information may be the agent's name, a customer account number, a reference number associated with a specific agent in the group of agent 112, or similar identifying information appreciable by one of ordinary skill in the art.

The identification data associated with the phone number, agent etc. are stored in a database 114, which can be located with the CTI Server 108, on the ACD 106 (as shown in FIG. 1), or elsewhere, either local to or remote from the system. The CTI Server 108 can be any suitable CTI server, such as a CTI Blended Agent gateway manufactured by Noble Systems or CT Connect from Intel Dialogic, Callpath from IBM, Avaya ASAI link, Nortel Symposium, etc. The database 114 can be a suitable database, such as an Informix database by IBM, an Oracle database, Microsoft SQLServer, etc.

Once an inbound call has been associated with a specific agent, then the CTI server 108 instructs the ACD 106 to route the call to the identified specific agent of the receiving agents 112. The specific agent then services the call. This results in a specific agent in the group of agents 112 being temporarily unavailable to receive inbound calls. While the specific agent is servicing a call, additional inbound calls or outbound placed calls (described below) associated with that specific agent may also be detected. Those calls are either terminated or placed in a queue associated with that specific agent. In an exemplary embodiment of the present invention, while in the queue, the person on hold may be played a message to continue holding, leave a voicemail for the agent, or schedule a callback from the specific agent. Additionally, an estimated hold time may be calculated using simple or complex algorithms, which may include utilizing system monitored data such as average length of typical calls, number of agents on duty at a specific time, etc. Further a callback feature option may be utilized in the queue, which allows callers to have the option of receiving a callback at a later time. The details of such functionality are described in further detail with reference to FIG. 4 below.

If a person remains on the line, once the specific agent becomes available again, the specific agent is routed the longest holding call in the queue. The details of the queue operations and the specific agents actions associated with those queue operations are discussed in further detail with reference to FIG. 4 below.

When the specific agent is available and no inbound calls are detected that are associated with the specific agent, nor are there any calls in the queue for the specific agent, then the CTI Server 108 may associated the specific agent with a set of telephone calls, known as "outbound calls." Stated another way, one or more outbound calls to be placed are allocated to be handled by a specific agent before the outbound calls are placed from the call center. The outbound calls are placed by the predictive dialer 110. The outbound calls are monitored by the predictive dialer 110, when an outbound call is answered it is routed to the specific agent. Notifying the specific agent in the group of agents 112 that the call routed to her is an answered outbound call may occur via a local area network (LAN) or other connection to the agents desktop PC or terminal.

If more than one outbound call is answered, then preferably the one answered first is routed to the specific agent, while the other answered call is played a message informing the caller to hold for the specific agent. That call is then placed in the queue associated with that specific agent. Additional information and/or interactive messages may be played while the call is in the queue. During the placement and answering of outbound calls associated with the specific agent, additional inbound calls determined to be associated with the agent may also be received by the ACD 106 of the call center. Those inbound calls may also be routed to the queue associated with the specific agent. In an exemplary embodiment of the present invention the functionality of the queue is the same for both inbound received calls and answered outbound calls, where the call with the longest time in the queue, regardless of being an inbound received call or an answered outbound call, is the next call to be handled by the specific agent when she becomes available. Other variations as to call priority are discussed below with reference to FIG. 4.

In an exemplary embodiment of the present invention, when the predictive dialer 110 places the outbound calls, the specific agent's phone is then immediately connected to a predictive dialer 110 through a bi-directional voice link (e.g., using one or more lines of a Ti) connecting the ACD 106 directly to the predictive dialer 110, so that when the predictive dialer 110 places the callbacks and the called party answers, the audio connection is immediately made between the called party and the specific agent of the group of agents 112.

Moreover, the predictive dialer 110 or additional processor such as a digital signal processor, ASIC, programmable IC (PIC), along with the use of analog to digital converters and/or digital to analog converters can monitor the telephone lines to determine if the outbound calls are answered by a person, an answering machine, or resulted in a busy signal, disconnected signal, not in service signal, etc. Such additional processor may be located with the predictive dialer 110, ACD 106, CTI Server 108, or housed separate from all three. Additionally, the determination of whether or not an answering machine answered the outbound call could be conducted by monitoring the length of time it takes for a connection to occur or how many rings occur before a connection, etc. Traditional methods for detecting the difference between an answering machine and a human answering a telephone line, are described in U.S. Pat. Nos. 5,371,787 and 5,724,420 among others and are well known to one of ordinary skill in the art. The predictive dialer 110 can be any suitable dialer, such as an ATOMS product by Noble Systems, a Mosaix dialer from Avaya, or ePro or Unison dialers from Concerto, etc.

The CTI server 108 may monitor the number of outbound calls that are in progress and those about to be made as well as the specific agent's availability, and based at least partially thereon adjusting the number of outbound calls placed associated with the specific agent. Additional information may also be utilized by the CTI server 108 to determine how many additional outbound calls should be associated with a specific agent and when the predictive dialer should place those outbound calls. Such information may include statistical data such as average duration of the specific agent's connected calls, the average number of connected calls achieved given a particular number of placed outbound calls, the historic times of day, month, etc. where inbound call traffic is heavy, or other data associated with system performance. The statistical data may be stored in the database 114 or other data storage location in the system accessible by the CTI Server 108. Such information may be utilized by a mathematical formula or algorithm to optimize the efficiency of the specific agent while minimizing the hold times for inbound calls received or answered outbound calls. In an exemplary embodiment of the present invention the mathematical formula or algorithm to optimize the efficiency of the specific agent may do so by determining how many outbound calls associated with a specific agent should be placed and determining the appropriate timing for initiating each of those calls.

In alternative embodiments of the present invention, the predictive dialer 110 may make outbound calls independent from the control of the CTI server 108. The predictive dialer 110 will automatically make outbound calls at the appropriate time according to an outbound call schedule stored in a call center database, such as database 114, unless the CTI/Server 108 overrides such functionality. For example, the CTI server 108 or some other process could update the call center database if some significant event happened (e.g., power failure, fire drill, etc.). Under those or similar circumstances, the predictive dialer 110 may be directed not to make the scheduled outbound calls. In an exemplary embodiment of the present invention, the scheduled outbound calls may be callbacks scheduled by callers who originally placed inbound calls to the system but were on hold for the specific agent in that specific agent's associated queue.

In an alternative embodiment of the present invention the control functions of the CTI server 108 may be allocated to the ACD 106, the predictive dialer 110 or both, or even another processor remote from the ACD 106 and predictive dialer 110. For example, the ACD 106 and predictive dialer 110 could be configured to communicate with each other directly to the agents 112, route calls to agents 112, and control the processes of the callback system. Thus, the need for the CTI-server 108 in implementing the callback process described in detail below may be circumvented with modification by one of ordinary skill in the art. Moreover, agents 112 could be connected directly to the predictive dialer 110 and/or the CTI server 108 while still be utilized to implement various functions of the specific agent call management methods described in further detail below. A more detailed description of the inbound and outbound call processing as well as the operation of the queue associated with a specific agent of this system in accordance with an embodiment of the present invention is described below in connection with FIGS. 2-4.

FIG. 2 is a flowchart of a process for placing outbound calls associated with specific agents, in accordance with an exemplary embodiment of the present invention. As shown in FIG. 2, the outbound call placing process begins by invoking step 202 to determine the appropriate number of outbound calls associated with a specific agent to be placed at once or within a given time period. The number of outbound calls that are in progress and those about to be made as well as the specific agent's availability are all monitored, and based at least partially thereon the number of outbound calls placed associated with the specific agent is adjusted to ensure the specific agent is utilized efficiently while minimizing the hold times for inbound calls received or answered outbound calls. Additional information may also be utilized to determine how many additional outbound calls should be associated with a specific agent and when those outbound calls should be placed. Such information may include statistical data such as average duration of the specific agent's connected calls, the average number of connected calls achieved given a particular number of placed outbound calls, the historic times of day, month, etc., where inbound call traffic is heavy, or other data associated with system performance. Such information further may be utilized by a mathematical formula or algorithm.

Next, step 204 retrieves the telephone numbers to be called from a data storage location and places the outbound calls associated with a specific agent. Step 206 monitors the calls to determine if the outbound calls are answered by a person, an answering machine, or resulted in a busy signal, disconnected signal, not in service signal, etc. If the call results in a busy signal, disconnected signal, not in service signal or no answer is detected, then the outbound call is terminated by step 208. Alternatively, if a connection to an answering machine is detected then a message may be played on the answering machine informing the customer of the specific agent's identity, the purpose of the call, and any callback information such as a callback number, operating hours, appointment time, etc.

If a connection to a person is detected, then step 210 is invoked to determine if the specific agent is available to immediately handle the answered outbound call. If the agent is available to take the answered outbound call, step 214 routes the answered outbound call to the specific agent. If the agent is not available to take the answered outbound call then step 212 is invoked to place the answered outbound call on hold in the specific agent's queue. The operation of the queue is discussed with reference to FIG. 4 below.

FIG. 3 is a flowchart of a process of routing inbound calls associated with specific agents to those specific agents, in accordance with an exemplary embodiment of the present invention. With reference to FIG. 3, the process of routing inbound calls associated with specific agents begins at step 302 with the detection of an incoming call to the call center. In an exemplary embodiment of the present invention, if no incoming calls are currently detected, nor are any being handled by the specific agent, then the system proceeds with the placing of outbound calls associated with the specific agent as described above with reference to FIG. 2.

If an inbound call is detected, then step 304 is invoked to determine if the call is to be associated with a specific agent. The determination of whether or not the call is associated with a specific agent may be conducted in a number of ways including through the use of identifying information received in connection with the inbound call. The received identifying information associating a specific agent with an inbound call may be but is not limited to the telephone number (ANI) associated with the inbound call, or alternatively, an automated screening process is used to prompt a caller to press digits, or simply speak, in response to prompts for identifying information related to a specific agent to which the caller wishes to speak. The identifying information may include the agent's name, a customer account number, a reference number associated with a specific agent, or similar identifying information appreciable by one of ordinary skill in the art.

More complex inquiries may be conducted to determine the specific agent for which the inbound call is to be associated. For example, the caller may navigate a series of prompts which narrow the focus of the particular reason the caller has placed the inbound call until the system identifies the specific agent best suited to handle the inbound caller's needs. Such implementation of call screening prompting and detection of digits pressed or voice recognition of a caller's responses are well known in the art and, thus, their implementation is not discussed further herein.

If the call is not to be associated with a specific agent then step 306 may be invoked to route the call to another agent for handling. However, if the call is to be associated with a specific agent, then step 308 is invoked to determine if the specific agent is available to take the call. If the agent is not available to take the answered outbound call then step 310 is invoked to place the answered outbound call on hold in the specific agent's queue. The operation of the queue is discussed with reference to FIG. 4 below. If the specific agent is available to take the answered outbound call, step 312 routes the answered outbound call to the specific agent for handling.

FIG. 4 is a flowchart of a process for processing calls, each of which is on hold for the specific agent associated with the call, in accordance with an exemplary embodiment of the present invention. According to FIG. 4, the process of handling a call on hold for its associated specific agent begins at step 402 where a call, inbound or outbound, has been placed on hold. When calls associated with a specific agent are placed on hold in that specific agent's associated queue the availability of the specific agent for which the call is to be routed is monitored by step 404. When the specific agent becomes available to handle one of the calls in the queue associated with that specific agent, step 406 is invoked to route the longest holding call in the queue to the specific agent.

In an exemplary embodiment of the present invention the functionality of the queue is the same for both inbound received calls and answered outbound calls, where the call with the longest time in the queue, regardless of being an inbound received call or an answered outbound call, is the next call to be handled by the specific agent when she becomes available. In an alternative embodiment of the present invention, inbound calls may be given priority over outbound calls in the queue, or when an inbound call is associated with a specific agent all placement of outbound calls which have yet to be answered by a customer are terminated. In yet another embodiment of the present invention, outbound calls associated with the specific agent which are scheduled callbacks to customers may be given higher priority than other calls in a specific agent's queue and may be moved to the front of the queue to be the next call handled by the specific agent. Other variations to call priority are appreciable by one of ordinary skill in the art.

If the specific agent is not available to handle the calls on hold in the queue, step 408 is invoked where, in the exemplary embodiment of the present invention described in FIG. 4, each call in the queue is presented the option of leaving a message for the specific agent and ending the call in step 410, or the "caller" (both inbound calls and outbound call recipients) may chose not to continue to wait for the holding period associated with that particular call, which is dependent on its order in the queue, by returning to step 402.

In alternative embodiments of the present invention, while in the queue, the person on hold may be played a message to either continue holding, leave a voicemail for the agent, and/or schedule a callback from the specific agent. Further, an estimated hold time may be calculated for each caller in the queue using simple or complex algorithms which may include utilizing system monitored data such as average length of typical calls, number of agents on duty at a specific time, etc. The caller may then be informed of the estimated hold time. Once the estimated hold time reaches a predetermined length and/or number of calls, then a callback feature option in accordance with the present invention may be implemented. The callback feature allows callers in the queue to have the option of receiving a callback at a later time. The callback can be made to a caller-specified number at the time the caller would have expected to be sent to the specific agent if she had stay in the holding queue based on estimated hold times, or alternatively the callback may occur at a time suggested by the system or at a time selected by the caller. As callbacks are made the estimated hold time for new callers is adjusted for this decrease in agent availability to handle any new calls.

In an alternative embodiment of the present invention, the callback option offered to customers in the specific agent's queue could be implemented as a special convenience for select customers, subscribers, or those who meet certain customer criteria, which may be based on the telephone number being dialed or called from, customers with an existing account, customers who subscribed to the service or a benefits package that includes the service, or based on a particular customer status level, or based on alternative or additional criteria as appreciated by one of ordinary skill in the art.

Further, in the exemplary embodiment of the present invention shown in FIG. 4, step 410 includes the specific agent being automatically routed the voicemail when it completes the call or calls the specific agent is handling. The specific agent may then choose to return the call of the caller who left the voicemail, or, alternatively if the caller requested a callback, or the specific agent initiates a callback, the system may automatically place an outbound call to the caller to route to the specific agent when an answer is detected by the system.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for managing inbound calls and outbound calls for a specific agent of a call center, the method comprising the steps of:
    (a) determining whether the specific agent is available to handle an inbound call or an outbound call;
    (b) detecting, by a telephony server, whether a received inbound call by the call center from a caller is available for the specific agent to handle; and
    (c) after determining the specific agent is available and detecting there is no received inbound call available for the specific agent to handle:
        (1) associating the specific agent, by the telephony server, with a plurality of outbound calls placed from the call center to a plurality of called parties;

(2) after detecting one of the plurality of outbound calls has been answered and the specific agent is still available, routing the one of the plurality of outbound calls to the specific agent to handle; and (3) detecting, by the telephony server, a subsequent inbound call has been received by the call center from a further caller following the step of associating the specific agent with the plurality of outbound calls;

(4) after detecting the subsequent inbound call, determining whether the specific agent is available;

(5) routing the subsequent inbound call to the specific agent to handle if the specific agent is available;

(6) placing the subsequent inbound call in a queue associated with the specific agent if the specific agent is not available; and (7) after routing the subsequent inbound call to the specific agent and while the specific agent is handling the subsequent inbound call:

(a) detecting, by the telephony server, a subsequent outbound call of the plurality of outbound calls that has been answered; and (b) placing the subsequent outbound call in the queue associated with the specific agent if the specific agent is not available.

2. The method of claim 1 further comprising the step of placing the plurality of outbound calls to the plurality of called parties after the plurality of specific calls has been associated with the specific agent.

3. The method of claim 1 further comprising the step of, after determining the specific agent has handled the subsequent inbound call and is available, routing the subsequent outbound call placed in the queue to the specific agent to handle.

4. The method of claim 1 further comprising the step of playing a message to the called party of the subsequent outbound call placed in the queue to: (1) continue holding for the specific agent to become available; (2) leave a voicemail for the specific agent; or (3) schedule a callback from the specific agent.

5. The method of claim 1 further comprising the steps of:
calculating an estimated hold time for the subsequent outbound call remaining in the queue; and
in response to determining the estimated hold time exceeds a predetermined length of time, providing the called party an option to receive a callback from the specific agent at a later time.

6. The method of claim 1 further comprising the steps of:
determining a number of inbound calls and outbound calls in the queue; and
in response to determining the number exceeds a predetermined number, providing the called party an option to receive a callback from the specific agent at a later time.

7. A tangible computer-readable storage medium comprising computer-executable instructions for managing inbound calls and outbound calls for a specific agent of a call center, the computer-executable instructions being configured, when executed by at least one computer processor, to:

(a) determine whether the specific agent is available to handle an inbound call or an outbound call;

(b) detect whether a received inbound call by the call center from a caller is available for the specific agent to handle; and (c) after determining the specific agent is available and detecting there is no received inbound call for the specific agent to handle:

(1) associate the specific agent with a plurality of outbound calls placed from the call center to a plurality of called parties;

(2) after detecting one of the plurality of outbound calls has been answered and the specific agent is still available, route the one of the plurality of outbound calls to the specific agent to handle;

(3) detect a subsequent inbound call has been received by the call center from a further caller following associating the specific agent with the plurality of outbound calls;

(4) after detecting the subsequent inbound call, determine whether the specific agent is available;

(5) route the subsequent inbound call to the specific agent to handle if the specific agent is determined to be available;

(6) place the subsequent inbound call in a queue associated with the specific agent if the specific agent is determined not to be available; and (7) after routing the subsequent inbound call to the specific agent and while the specific agent is handling the subsequent inbound call:

(a) detect a subsequent outbound call of the plurality of outbound calls that has been answered; and (b) place the subsequent outbound call in the queue associated with the specific agent if the specific agent is determined not to be available.

8. The computer-readable storage medium of claim 7, wherein the computer-readable instructions are further configured to place the plurality of outbound calls to the plurality of called parties after the plurality of specific calls has been associated with the specific agent.

9. The computer-readable storage medium of claim 7, wherein the computer-readable instructions are further configured to route the subsequent outbound call placed in the queue to the specific agent to handle after determining the specific agent has handled the subsequent inbound call and is available.

10. The computer-readable storage medium of claim 7, wherein the computer-readable instructions are further configured to play a message to the called party of the subsequent outbound call placed in the queue to: (1) continue holding for the specific agent to become available; (2) leave a voicemail for the specific agent; or (3) schedule a callback from the specific agent.

11. The computer-readable storage medium of claim 7, wherein the computer-readable instructions are further configured to:
calculate an estimated hold time for the subsequent outbound call remaining in the queue; and
in response to determining the estimated hold time exceeds a predetermined length of time, provide the called party an option to receive a callback from the specific agent at a later time.

12. The computer-readable storage medium of claim 7, wherein the computer-readable instructions are further configured to:
determine a number of inbound calls and outbound calls in the queue; and
in response to determining the number exceeds a predetermined number, provide the called party an option to receive a callback from the specific agent at a later time.

13. A system for managing a specific agent of a call center, the system comprising:
a telephony server configured to:
(a) determine whether the specific agent is available to handle an inbound call or an outbound call;
(b) detect whether a received inbound call by the call center from a caller is available for the specific agent to handle; and (c) after determining the specific agent is available and detecting there is not the received inbound call for the specific agent to handle:
  (1) associate the specific agent with a plurality of outbound calls placed from the call center to a plurality of called parties;
  (2) after detecting one of the plurality of outbound calls has been answered and the specific agent is still available, instruct an automatic call distributor to route the one of the plurality of outbound calls to the specific agent to handle;
  (3) detect a subsequent inbound call has been received by the call center from a further caller following associating the specific agent with the plurality of outbound calls;
  (4) after detecting the subsequent inbound call, determine whether the specific agent is available;
  (5) instruct the automatic call distributor to route the subsequent inbound call to the specific agent to handle if the specific agent is determined to be available;
  (6) instruct the automatic call distributor to place the subsequent inbound call in a queue associated with the specific agent if the specific agent is determined not to be available; and
  (7) after routing the subsequent inbound call to the specific agent and while the specific agent is handling the subsequent inbound call:
    (a) detect a subsequent outbound call of the plurality of outbound calls that has been answered; and
    (b) instruct the automatic call distributor to place the subsequent outbound call in the queue associated with the specific agent if the specific agent is determined not to be available.

14. The system of claim 13, wherein the telephony server is further configured to instruct a predictive dialer to place the plurality of outbound calls to the plurality of called parties after the plurality of specific calls has been associated with the specific agent.

15. The system of claim 13, wherein the telephony server is further configured to route the subsequent outbound call placed in the queue to the specific agent to handle after determining the specific agent has handled the subsequent inbound call and is available.

16. The system of claim 13, wherein the telephony server is further configured to play a message to the called party of the subsequent outbound call placed in the queue to: (1) continue holding for the specific agent to become available; (2) leave a voicemail for the specific agent; or (3) schedule a callback from the specific agent.

17. The system of claim 13, wherein the telephony server is further configured to:
  calculate an estimated hold time for the subsequent outbound call remaining in the queue; and
  in response to determining the estimated hold time exceeds a predetermined length of time, provide the called party an option to receive a callback from the specific agent at a later time.

18. The system of claim 13, wherein the telephony server is further configured to:
  determine a number of inbound calls and outbound calls in the queue; and
  in response to determining the number exceeds a predetermined number, provide the called party an option to receive a callback from the specific agent at a later time.

* * * * *